July 18, 1961   L. G. SHOWKER ET AL   2,992,704
CHOCKS
Filed May 9, 1960   2 Sheets-Sheet 1
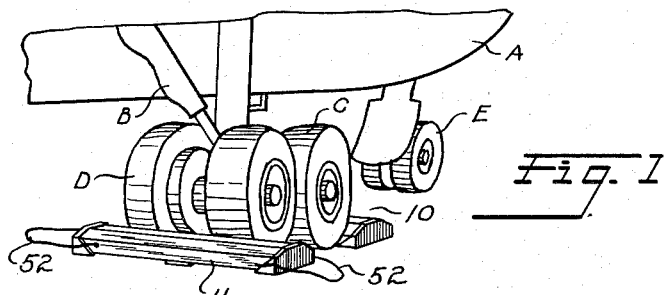
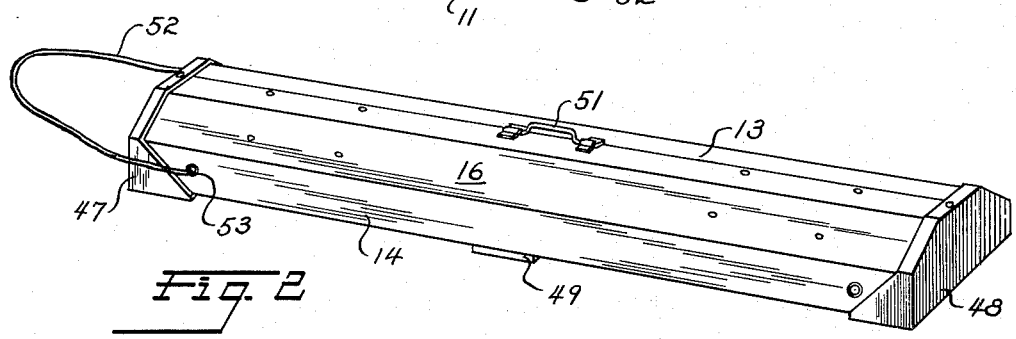
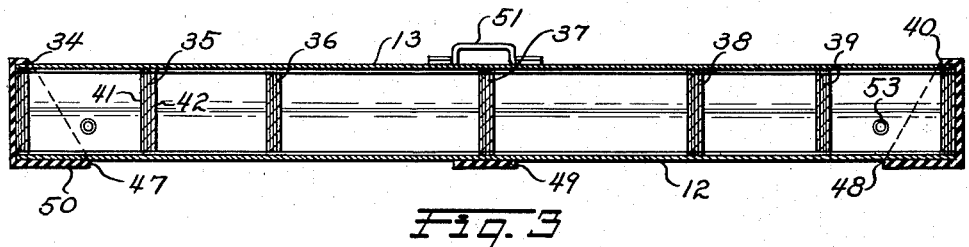
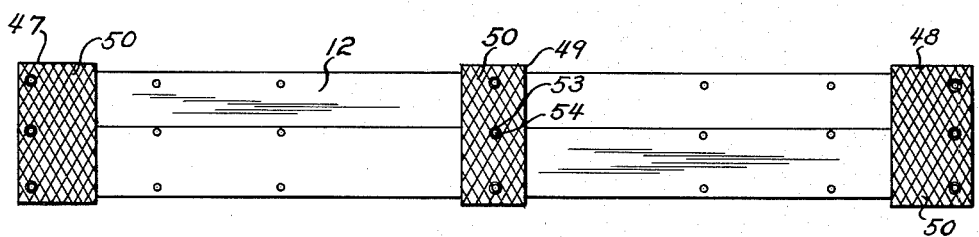
INVENTORS
LUCILLE G. SHOWKER
RANDOLPH S. SHOWKER
BY Herbert M Birch
ATTORNEY July 18, 1961  L. G. SHOWKER ET AL  2,992,704
CHOCKS
Filed May 9, 1960  2 Sheets-Sheet 2

INVENTORS
LUCILLE G. SHOWKER
RANDOLPH S. SHOWKER

BY Herbert M. Birch
ATTORNEY

United States Patent Office 2,992,704
Patented July 18, 1961

2,992,704
CHOCKS
Lucille G. Showker and Randolph S. Showker, Orlando, Fla., assignors to John Q. Harrison, Orange County, Fla.
Filed May 9, 1960, Ser. No. 27,749
4 Claims. (Cl. 188—32)

The present invention relates generally to wheel chocks.

Heretofore wheel chocks have usually been made from solid wood wedges. These early forms of wooden chocks are very heavy and cumbersome and often become waterlogged, whereby their weight is increased requiring considerable effort and time to remove them from wheel chocking position. Also, usual prior art wheel chocks are not readily removed from their respective wheel wedging positions without the use of a tool of some form to force the chocks out of position.

For example, one specific use of wheel chocks is in connection with stabilizing grounded aircraft of all types and particularly when used with large U.S.A.F. bombers, it is imperative that the chocks be large enough to do the job and yet light enough to be quickly removed to permit minimum take-off time following an alert signal or the like. A few seconds delay in removing heavy waterlogged chocks may obviously prove disastrous, as aircraft caught on the ground may easily be destroyed by an attacking air force.

It is an object of this invention to provide a novel wheel chock of minimum weight for a required maximum of strength and durability, whereby the same may be efficiently and quickly removed from a wheel chocking position in a minimum of time.

Another object is to provide a novel chock formed of extruded material, such as aluminum or the like adapted to be fabricated into a finished product on an economical mass production basis.

A further object is to provide an elongated wheel chock of extremely light weight material, such as elongated half sections of aluminum or similar lightweight metal, including novel manual handling means for providing manual mobility thereto for the placement and removal of the chock to and from wheel wedging positions.

Still another object is to provide a wheel chock highly resistant to weather conditions.

Yet another object is to provide anti-slip means in combination with a novel reinforced lightweight waterproof chock construction.

With the foregoing and other objects in view, which will become apparent as the invention is fully understood, the same resides in the novelty of construction, combination and arrangement of elements hereinafter described in detail and distinctly claimed in the appended claims.

The following description should be read in conjunction with the accompanying drawings, wherein:

FIGURE 1 is a perspective view of part of the undercarriage of a large grounded aircraft, showing wheel chocks of the present invention placed in operative wheel chocking fore and aft positions;

FIGURE 2 is a top side perspective view of one of the wheel chocks of FIGURE 1 removed;

FIGURE 3 is a longitudinal cross section view taken on the line 3—3 of FIGURE 2;

FIGURE 4 is a bottom plan view of the chock; and

Figure 5:
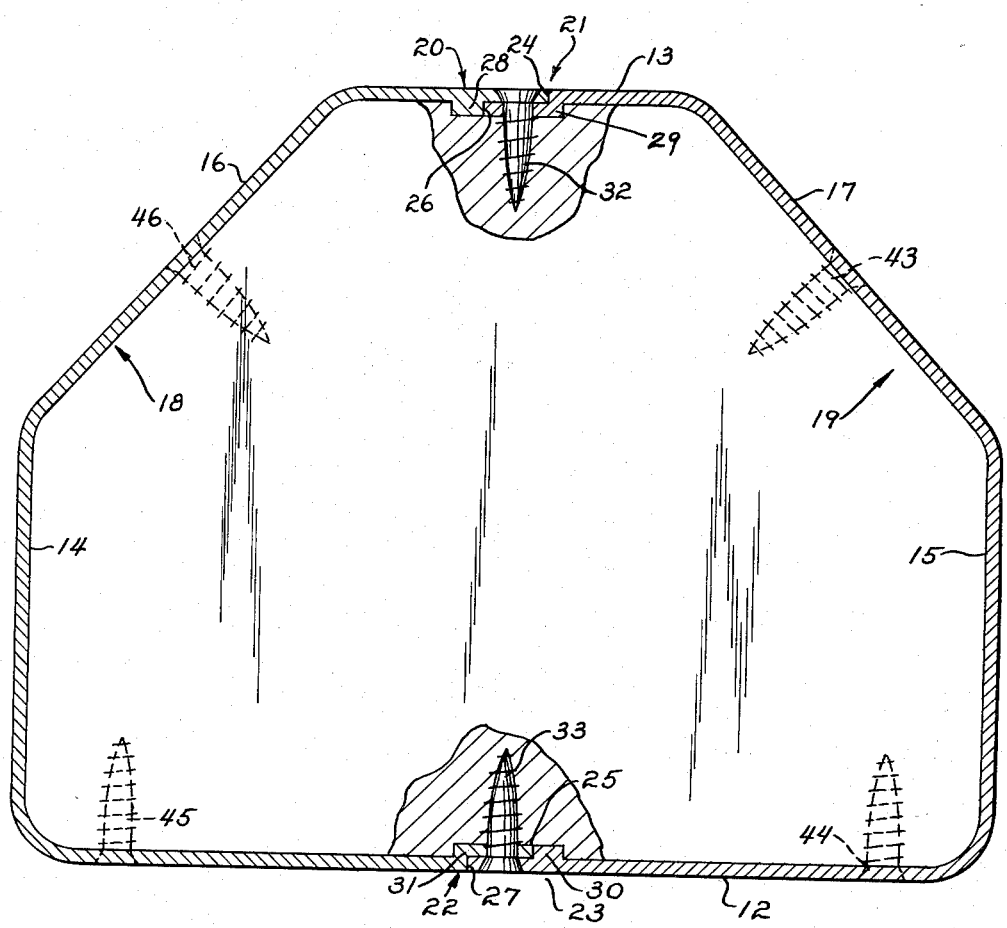
FIGURE 5 is a transverse cross section view taken on line 5—5 of FIGURE 2.

Referring in detail to the drawings and first with particular reference to FIGURE 1, there is shown part of the undercarriage B and dual wheels C and D of an aircraft A, such as a B-52G, looking forward from under the same toward its nose wheel E. As illustrated, there is a chock 10 wedged and positioned across the forewheels C and a chock 11 wedged and positioned across the aft-wheels D of the undercarriage.

Each chock is an elongated hexagonal body having a relatively wide bottom surface 12 with respect to a relatively narrower top surface 13, said bottom surface having spaced parallel side surfaces 14 and 15, respectively, extending substantially perpendicular to the planes of the top and bottom surfaces and ramps 16 and 17 on each side joining the side surfaces 14 and 15 respectively with the opposite edges of the top surface 13. Thus the respective chocks 10 and 11 each have slanting surfaces or ramps 16 and 17 on each respective side thereof, which ramps wedge under the peripheral face or surface rim of the undercarriage's fore and aft wheels C and D, as shown in FIGURE 1. Also, as shown the wheels are provided with the usual large rubber tires, which deform as they are forced into engagement with the chocks, and tend to bulge over the perpendicular side surfaces onto the respectively adjacent ramp surface, thereby providing a downward thrust on the chock from the weight of the aircraft to provide positive securing action and anti-slip resistance to undesired or accidental displacement of the chocks.

Each of the present novel chocks are formed of elongated extruded half sections of material 18 and 19, such material preferably being aluminum. Each section 18 and 19 is formed with opposed interfitting joint connections 20 and 21 and 22 and 23 along its respective upper and lower spaced longitudinal edges 24—25 and 26—27, see FIGURE 5.

For example, joint connection 20 comprises an elongated rectangular rib 28 spaced from the edge 24 of half section 18, while joint connection 21 of opposed half section 19 is formed with an off-set tongue 29 of a width equal to the spacing of the adjacent side of the rib 28 from the edge 24; and with the depth of the off-set equal to the thickness of the material of the sections, in the provision of a lapped flush joint connection along the top surface of the chock.

Joint connection 23 also comprises an elongated rectangular rib 30 spaced from the edge 27 of half section 19, while joint connection 22 of opposed half section 18 is formed with an off-set tongue 31 of a width equal to the spacing of the adjacent side of the rib 30 from the edge 27; and with the depth of the off-set equal to the thickness of the material of the said half sections, in the provision of a lapped flush joint along the bottom surface of the chock.

These lapped joints are suitably secured, for example by flat "Phillips Head" screw fasteners 32 at the top and 33 at the bottom, which screws extend through aligned superimposed openings longitudinally spaced apart along the lapped joint sections. Preferably the exterior fastener opening of each joint connection is conical to flush seat the flat headed portions of the respective screw fasteners.

The half sections 18 and 19 when positioned together to form the said joint connections, are secured to longitudinally spaced reinforcement means or struts 34, 35, 36, 37, 38, 39 and 40, see FIGURE 3. These struts may be of moisture proof and anti-rust sheet material, such as plywood with a resin-impregnated overlaid face 41 and 42 on each side, which provides a laminated reinforcement sheet, which will permit the half sections 18 and 19 to be secured to the inner ply exposed edges thereof by screw fasteners, such as 32 and 33 and 43, 44, 45 and 46, see FIGURE 5.

This plywood product with the overlay surfaces 41 and 42 of kraft fiber impregnated with a phenol cresylic acid formaldehyde condensation resin provides maximum strength while minimizing weight, to thereby cooperate with the outer light weight aluminum shell sections 18 and 19. Thus in the resulting product the strength to weight ratio is maximized.

In FIGURES 2, 3 and 4, there is shown an anti-slip means, comprised for example of suitable material such as end caps 47 and 48 and a mid-strip 49 molded from reclaimed rubber. This anti-slip means also has a raised tread 50 formed on the exterior surface thereof and when the chock is forced downward by an engaging wheel the tread grips the runway surface to thereby prevent slipping.

The placement of the clocks from wheel engaged positions is facilitated by a rigid handle 51 secured to the top of the same and the removal of the chock from wheel engaged positions is facilitated by a looped drag cable 52, which extends through a transverse tube 53 having the ends thereof swaged or upset in transversely aligned openings adjacent one or both ends of the chock, see FIGURE 2. Also, the molded rubber bumper and anti-slip caps 47 and 48 and the rubber strip 49 are formed with countersunk screw openings in which are imbedded metal washers 53 formed to seat the screw heads 54 slightly below the tread 50 thereof.

The use of the chock members is believed reasonably clear from the foregoing description. Briefly summarizing the use of the same, an aircraft is chocked on the ground or landing surface by manually grasping the carrying handle 51, see FIGURES 2 and 3, and thus placing each chock against the craft wheels C and D, as shown in FIGURE 1. These chocks are laterally wedged against the tire wheels, so the same bulge over the adjacent side surfaces 14 or 15 into contact with one of the ramps 16 and 17. This wedging and bulge over provides a downward component of force on the chocks and the gripping treads 50 of the respective rubber anti-slip means coact to increase the holding efficiency of the chocks.

Assuming an air defense alert signal is sounded and the chocks 10 and 11 must be quickly removed, the land crew dashes over and grabs a drag rope 52 of each chock and dislodges and removes the respective chocks, so the aircraft may take-off without delay.

Other uses may be provided for the chocks since they may be used for any type of wheeled vehicle.

While only one embodiment is hereinbefore illustrated and described, it is to be expressly understood that this invention is not limited to the exact formation, construction or arrangement of parts as illustrated and described, because various modifications may be made within the scope of the appended claims.

What we claim is:

1. A wheel chock comprising an elongated body formed of interfitting hollow sections, said body having a relatively wide bottom surface and a relatively narrower top surface, spaced parallel side surfaces each extending from an opposite side edge of the bottom surface, ramps on each side of the body each joining the said spaced parallel surfaces with a respective opposite side edge of the said top surface, reinforcing means within said elongated body to prevent the body from collapsing under load, a transverse tube across each end of the body, a handle secured to said top surface, and a drag loop reeved through said transverse tube.

2. A lightweight weather resistant hollow chock comprising elongated extruded aluminum half sections, each section having upper and lower joint connections formed along the free ends of each elongated upper and lower edge thereof, said upper and lower joint connections of each section being formed complementary with respect to the opposed upper and lower joint connections of the other section, whereby a waterproof flush joint is formed when the same are fitted together, transversely extending reinforcing means secured at spaced longitudinal intervals within the bore of the chock, and fastener means securing said reinforcing means within the chock bore.

3. A lightweight weather resistant hollow chock comprising elongated extruded aluminum half sections, each section having upper and lower joint connections formed along the free ends of each elongated upper and lower edge thereof, said upper and lower joint connections of each section being formed complementary with respect to the opposed upper and lower joint connections of the other section, whereby a waterproof flush joint is formed when the same are fitted together, transversely extending reinforcing means secured at spaced longitudinal intervals within the bore of the chock, and fastener means securing said reinforcing means within the chock bore, some of said fastener means likewise securing a molded rubber end cap to each opposite end of said chock.

4. The chock described in claim 3, wherein said molded rubber end caps are faced with an anti-slip tread surface.

References Cited in the file of this patent
UNITED STATES PATENTS

| | | |
|---|---|---|
| 2,184,487 | Clark | Dec. 26, 1939 |
| 2,189,323 | Noonan | Feb. 6, 1940 |
| 2,442,501 | Mast et al. | June 1, 1948 |
| 2,522,104 | Edwards | Sept. 12, 1950 |